United States Patent [19]
Scheckenbach et al.

[11] Patent Number: 5,891,988
[45] Date of Patent: Apr. 6, 1999

[54] PROCESS FOR THE OXIDATION OF POLYARLENE COMPOUNDS CONTAINING THIOETHER GROUPS

[75] Inventors: Helmut Scheckenbach, Langen; Klaus Delpy, Dietzenbach; Stefan Disch, Frankfurt, all of Germany

[73] Assignee: Ticona GmbH, Germany

[21] Appl. No.: 929,211

[22] Filed: Sep. 9, 1997

[30]     Foreign Application Priority Data

Sep. 10, 1996 [DE] Germany ............... 196 36 692.5

[51] Int. Cl.$^6$ ...................................... C08G 75/00
[52] U.S. Cl. ................ 528/373; 528/480; 528/486; 528/489
[58] Field of Search .................. 528/373, 480, 528/486, 489

[56]      References Cited

U.S. PATENT DOCUMENTS

| | | | |
|---|---|---|---|
| 3,819,582 | 6/1974 | Feasey | 260/63 |
| 4,303,776 | 12/1981 | Baron | 528/171 |
| 4,563,509 | 1/1986 | Liang | 525/537 |
| 5,496,916 | 3/1996 | Fleischer et al. | 528/373 |

FOREIGN PATENT DOCUMENTS 0 010 595  5/1980  European Pat. Off. .

*Primary Examiner*—James J. Bell
*Attorney, Agent, or Firm*—Connolly & Hutz

[57]      ABSTRACT

The process for the preparation of polyarylene sulfones by oxidation of polyarylene sulfides with an oxidizing agent in the presence of a liquid is carried out under reduced pressure so that the liquid boils. The reaction temperature can easily be kept constant in the process.

13 Claims, No Drawings

PROCESS FOR THE OXIDATION OF POLYARLENE COMPOUNDS CONTAINING THIOETHER GROUPS

The invention relates to a process for the preparation of polyarylene sulfones by oxidation of polyarylene sulfides, which are also referred to as polyarylene thioethers.

A process for the preparation of polyarylene sulfones by oxidation of polyarylene sulfides with hydrogen peroxide in concentrated sulfuric acid is described in DE-A1-19 38 806 and Chimia 28, 567 (1974). The disadvantage of the process is that large temperature fluctuations occur during the reaction.

The use of a hydrogen peroxide/acetic acid mixture for the oxidation of aromatic polythioethers containing sulfonyl groups is described in Chimia 28, 567 (1974). However, this process requires the use of large amounts of suspension media and high temperatures.

A process for the preparation of polyarylene sulfones by oxidation of polyarylene sulfides in acetic acid with hydrogen peroxide with the addition of catalytic amounts of sulfuric acid or organic equilibrium peracid is described in DE-A1-4314738. This process has the disadvantage that the reaction temperature is subject to large fluctuations during the hydrogen peroxide metering.

It was therefore the object to avoid the disadvantages of the known processes and to develop a process in which the reaction temperature remains substantially constant during the hydrogen peroxide and peracid metering.

It was found that the temperature of the reaction mixture can easily be kept constant in the preparation of polyarylene sulfones by oxidation of polyarylene sulfides with hydrogen peroxide or peracids if reduced pressure prevails so that the liquid reaction medium, for example the solvent, boils.

The invention thus relates to a process for the preparation of polyarylene sulfones by oxidation of polyarylene sulfides with an oxidizing agent in the presence of a liquid, reduced pressure being applied so that the liquid boils.

Polyarylene sulfides, in particular polyphenylene sulfide, can be prepared by the reaction of dihalogenated aromatics with sodium sulfide according to EDMONDS and HILL. Polyarylene sulfides and their preparation are described in "Ullmann's Encyclopedia of Industrial Chemistry", Volume A21, B. Elvers, S. Hawkins and G. Schulz (Eds.), VCH, Weinheim-New York 1992, pages 463–472, which is hereby incorporated by reference.

Polyarylene sulfones are polymers which contain arylene sulfone units. The polyarylene sulfones may be completely or partially oxidized polyarylene sulfides. Processes for the preparation of polyarylene sulfones are described in DE-A1-4314737 and DE-A1-4314738, which are hereby incorporated by reference.

Oxidizing agents are hydrogen peroxide, hydrogen peroxide in an inorganic or organic acid or inorganic or organic peracids. An inorganic acid is, for example, sulfuric acid. Organic acids are, for example, aromatic or aliphatic carboxylic acids, such as benzoic acid or acetic acid. If the acid is a liquid, it may be used as the reaction medium. The acids may contain water or may be dissolved in water. An inorganic peracid is, for example, Caro's acid. An organic peracid is, for example, peracetic acid. Advantageously, sulfuric acid is added to organic acids. An exception is the reaction in formic acid. It requires no further activation by mineral acids. Preferred oxidizing agents are hydrogen peroxide in concentrated sulfuric acid or hydrogen peroxide in concentrated acetic acid, which advantageously may also contain from 0.1 to 10 percent by volume, in particular from 1 to 5 percent by volume, of sulfuric acid. Water-diluted acids are also used.

Mixtures of hydrogen peroxide and an acid generally form a peracid which is in equilibrium with the starting materials and is therefore referred to as equilibrium peracid.

Hydrogen peroxide is generally used in the form of a 20 to 70% strength aqueous solution. However, more highly concentrated solutions or pure hydrogen peroxide may also be used.

When sulfuric acid is used as the reaction medium, the oxidation is carried out at temperatures from −30° C. to 140° C., preferably from 0° C. to 90° C., and at pressures of from $1*10^{-5}$ mbar to 10 mbar, preferably from $1*10^{-3}$ mbar to 1 mbar. The oxidation in organic acids takes place in general at temperatures of from 20° C. to 120° C., preferably from 40° C. to 90° C., and at pressures of from 1 mbar to 1000 mbar, preferably from 5 mbar to 500 mbar.

The reaction time is in general in the range from 0.5 to 12 hours, preferably from 1 to 4 hours.

EXAMPLES

Example 1

54.08 g of poly-1,4-phenylene sulfide powder having a mean particle diameter of $2*10^{-5}$ m (glass transition temperature $T_g=94°$ C., melting point $T_m=287°$ C.) were initially taken in a mixture of 196.7 g of concentrated acetic acid and 1 ml of concentrated sulfuric acid. At a temperature of 63° C., a constant pressure of 140 mbar was applied so that the reaction mixture was observed to boil gently. Under these conditions, 81.74 g of 50% strength hydrogen peroxide were added dropwise in the course of 1 h, the boiling point of the reaction mixture at the end of the addition at 140 mbar being 60° C. After the addition, stirring was continued for 2 h at 140 mbar and 600° C. The product was filtered off, washed with water and dried at 100° C. under reduced pressure.

Yield: 63.85 g

Characterization of the product by differential scan calorimetry (DSC) gives:

$T_g=350°$ C., $T_m=520°$ C.

Elemental analysis of the product: calculated for a polyphenylene sulfone having 100% of sulfonyl groups: C 51.4%, H 2.9%, S 22.9%, O 22.8% found: C 55.8%, H 2.9%, S 24.6%, O 15.4%, If poly-1,4-phenylene sulfide is assigned a degree of oxidation of 0% and a completely oxidized poly-1,4-phenylene sulfone in which the sulfur is present exclusively as the sulfone group is assigned a degree of oxidation of 100%, the elemental analysis gives a degree of oxidation of 62.1% for the poly-1,4-phenylene sulfone formed as the product.

Investigation of the poly-1,4-phenylene sulfone by ESCA (Electron Spectroscopy for Chemical Analysis) shows that sulfide, sulfoxide and sulfone groups are present in the polymer.

Example 2

25.94 g of poly-1,4-phenylene sulfide powder having a mean particle diameter of $2*10^{-5}$ m ($T_g=94°$ C., $T_m=287°$ C.) was suspended in 400 ml of concentrated sulfuric acid. At a temperature of 60° C., a constant pressure of 0.05 mbar was applied so that the reaction mixture was observed to boil gently. Under these conditions, an equilibrated mixture of 21 ml of hydrogen peroxide (100% strength) and 300 ml of sulfuric acid (Caro's acid) were added dropwise in the course of 30 minutes, the boiling point of the reaction mixture at the end of the addition at 0.05 mbar being 55° C. At the beginning of the peroxide addition, the reaction mixture acquired a greenish color and became darker with further addition, until a clear, brown solution was formed toward the end of the peroxide addition. After the end of the peroxide addition, the product was precipitated as a colorless precipitate. Stirring was then continued for 30 minutes at 0.05 mbar and 55° C. The product was introduced into 5 l of ice water, filtered off, washed neutral with water and dried at 100° C. under reduced pressure.

Yield: 29.5 g

DSC characterization of the product: $T_g$=350° C., $T_m$=520° C.

Elemental analysis of the product: calculated for a polyphenylene sulfone having 100% of sulfonyl groups: C 51.4%, H 2.9%, S 22.9%, O22.8% found: C 51.5%, H3.0%, S 22.7%, O 22.6%.

The result of the elemental analysis corresponds to a degree of oxidation of 99% of the product.

Example 3

50 g of poly-1,4-phenylene sulfide powder having a mean particle diameter of $2*10^{-5}$ m (glass transition temperature $T_g$=94° C., melting point $T_m$=287° C.) were initially taken from 200 g of concentrated formic acid. At a temperature of 56° C., a constant pressure of 190 mbar was applied so that the reaction mixture was observed to boil gently. Under these conditions, 80 g of 50% strength hydrogen peroxide were added dropwise in the course of 1 h, and the boiling point of the reaction mixture did not change in the course of the reaction. After the addition, stirring was continued for 2 h at 190 mbar and 56° C. The product was filtered off, washed with water and dried at 100° C. under reduced pressure.

Yield: 61 g

DSC characterization of the product: $T_g$=350° C., $T_m$=520° C.

Elemental analysis of the product: calculated for a polyphenylene sulfone having 100% of sulfonyl groups: C 51.4%, H 2.9%, S 22.9%, O 22.8% found: C 53.9%, H 3.0%, S 24.0%, O 19.1%.

The result of the elemental analysis corresponds to a degree of oxidation of 81% of the product.

We claim:

1. A process for the preparation of a polyarylene sulfone by oxidation of a polyarylene sulfide with an oxidizing agent in the presence of a liquid at a predetermined reaction temperature, comprising the step of applying reduced pressure such that the liquid boils and keeping the reacture temperature constant throughout the process.

2. The process as claimed in claim 1, wherein the oxidizing agent is hydrogen peroxide, an inorganic or organic peracid or hydrogen peroxide in the presence of an inorganic or organic acid.

3. The process as claimed in claim 1, wherein the oxidizing agent is hydrogen peroxide in the presence of acetic acid, formic acid or sulfuric acid.

4. The process as claimed in claim 1, wherein the liquid contains water.

5. The process as claimed in claim 1, wherein the liquid contains from 0.1 to 10% by volume of sulfuric acid or another inorganic acid.

6. The process as claimed in claim 1, wherein the reaction temperature is of from 20° to 120° C.

7. The process as claimed in claim 1, wherein said reduced pressure is of from 1 to 1000 mbar.

8. The process as claimed in claim 1, wherein the liquid is concentrated sulfuric acid and the reaction temperature is in the range from −30° C. to 140° C.

9. The process as claimed in claim 1, wherein the liquid is sulfuric acid and said reduced pressure is in the range from $1*10^{-5}$ mbar to 10 mbar.

10. The process as claimed in claim 3, wherein the reaction temperature is from 40° C. to 90° C.

11. The process as claimed in claim 10, wherein said reduced pressure is from 5 mbar to 500 mbar.

12. The process as claimed in claim 11, wherein the liquid is concentrated sulfuric acid and the reaction temperature is in the range from 0° C. to 90° C.

13. The process as claimed in claim 12, wherein said reduced pressure is in the range from $1*10^{-3}$ mbar to 1 mbar.

* * * * *